US006997319B2

(12) United States Patent
Mahon et al.

(10) Patent No.: US 6,997,319 B2
(45) Date of Patent: Feb. 14, 2006

(54) HEAT RESISTANT FOAM-IN-BAG PACKAGING

(75) Inventors: William Joseph Mahon, Southbury, CT (US); Timothy Theodore Oberle, Brookfield, CT (US); Joe Milton Bowen, Anderson, SC (US); Robert Don Wheeler, Fairfield, CT (US)

(73) Assignee: Sealed Air Corporation, Saddle Brook, NJ (US)

( * ) Notice: Subject to any disclaimer, the term of this patent is extended or adjusted under 35 U.S.C. 154(b) by 0 days.

(21) Appl. No.: 10/807,049

(22) Filed: Mar. 23, 2004

(65) Prior Publication Data

US 2005/0210838 A1   Sep. 29, 2005

(51) Int. Cl.
B65D 30/08   (2006.01)

(52) U.S. Cl. .................. 206/524; 206/523; 383/109; 428/35.2

(58) Field of Classification Search ........ 206/522–524, 206/524.1; 383/10, 109, 113, 116; 428/35.2, 428/35.3, 35.4
See application file for complete search history.

(56) References Cited

U.S. PATENT DOCUMENTS

| | | | |
|---|---|---|---|
| 3,570,375 A | 3/1971 | Williams et al. | |
| 4,674,268 A | 6/1987 | Gavronsky et al. | |
| 4,800,705 A | 1/1989 | Bodolay | |
| 4,800,708 A | 1/1989 | Sperry | |
| 4,854,109 A | 8/1989 | Pinarer et al. | |
| 4,923,718 A | 5/1990 | Iida et al. | |
| 4,938,007 A | 7/1990 | Sperry | |
| 4,997,707 A | 3/1991 | Otawa et al. | |
| 5,027,583 A | 7/1991 | Chelak | |
| 5,098,778 A | 3/1992 | Minnick | |
| 5,102,722 A | 4/1992 | Iida et al. |
| 5,139,151 A | 8/1992 | Chelak |
| 5,255,847 A | 10/1993 | Sperry et al. |
| 5,316,834 A | 5/1994 | Matsuda et al. |
| 5,376,219 A | 12/1994 | Sperry et al. |
| 5,452,914 A | 9/1995 | Hirai |
| 5,590,816 A | 1/1997 | Bertram et al. |
| 5,699,902 A | 12/1997 | Sperry et al. |
| 5,791,522 A | 8/1998 | Lee et al. |
| 5,873,221 A | 2/1999 | Sperry et al. |
| 5,899,325 A | 5/1999 | Bertram et al. |
| 5,913,603 A | 6/1999 | Sperry et al. |
| 5,950,875 A | 9/1999 | Lee et al. |
| 5,996,782 A | 12/1999 | Sperry et al. |

(Continued)

FOREIGN PATENT DOCUMENTS

JP   4-307231   10/1992

(Continued)

OTHER PUBLICATIONS

U.S. Appl. No. 10/319,123, filed Dec. 13, 2002, Sperry et al.

(Continued)

Primary Examiner—Jim Foster
(74) Attorney, Agent, or Firm—Alston & Bird LLP

(57) ABSTRACT

The invention is a thermoplastic film having a heat resistant coating. The film is particularly useful in the preparation of bags and associated packaging systems that are used for protecting and packaging articles. Typically, the heat resistant coating has a melting range that is greater than the melting temperature of the thermoplastic film and exceeds the temperature of the heat generated during foam formation. As such, packaging films and bags that are prepared in accordance with the invention help prevent foam-in-bag cushions from fusing together. Particularly useful heat resistant coatings include ink varnishes and resins that are solvent-based, water-based, or energy cured.

29 Claims, 6 Drawing Sheets

U.S. PATENT DOCUMENTS

| | | |
|---|---|---|
| 6,003,288 A | 12/1999 | Sperry et al. |
| 6,065,636 A | 5/2000 | Sperry et al. |
| 6,272,813 B1 | 8/2001 | Sperry et al. |
| 6,528,127 B1 | 3/2003 | Edlein et al. |
| 6,629,599 B2 | 10/2003 | Sperry et al. |
| 6,675,557 B2 | 1/2004 | Sperry et al. |
| 2001/0049921 A1 | 12/2001 | Sperry et al. |
| 2002/0092272 A1 | 7/2002 | Sperry et al. |
| 2003/0179957 A1 * | 9/2003 | Tankersley .................. 383/10 |

FOREIGN PATENT DOCUMENTS

| | | |
|---|---|---|
| JP | 11-10810 | 1/1999 |

OTHER PUBLICATIONS

Instapak Foam-in-Place Packaging from Sealed Air; http://www.sealedair.com/products/protective/instapak/instapak_cushion.htm; 7 pages.

* cited by examiner

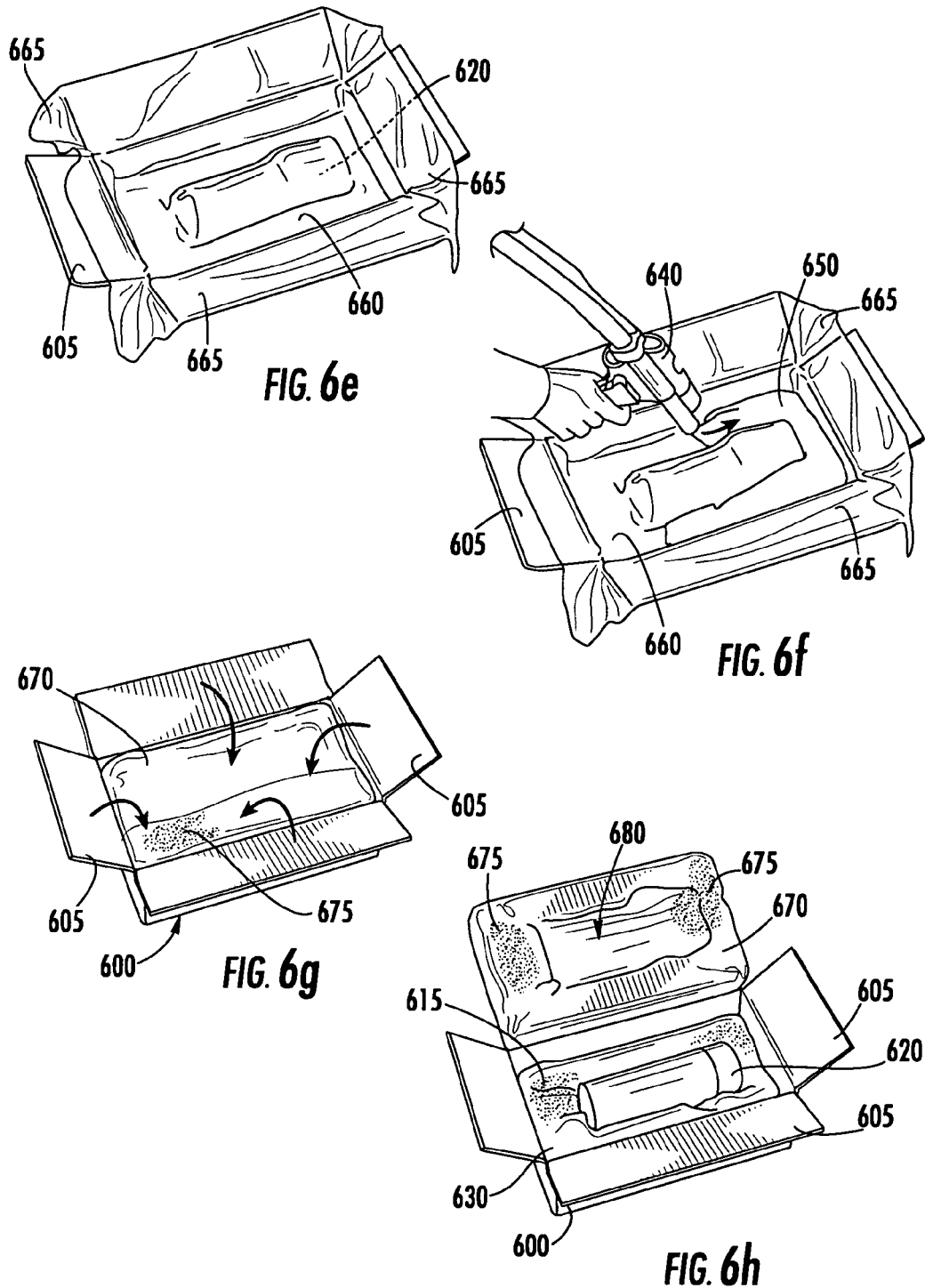

HEAT RESISTANT FOAM-IN-BAG PACKAGING

BACKGROUND OF THE INVENTION

The invention relates generally to foam-in-place packaging systems, and in particular to foam packaging products that are prepared from mixing foam precursors together to form a foam.

Foam-in-place packaging is a technique for producing cushioning that is used in the packaging of fragile articles to be shipped. Foam-in-place packaging comprises generating foam cushioning on an as-needed basis while the article to be protected is being packaged. In general, foam-in-place packaging employs foamable compositions that are produced by mixing two or more precursor chemicals that react to form a polymer foam that hardens on curing. For example, a liquid polyol-containing precursor and a liquid isocyanate-containing precursor may be mixed and reacted to form a polyurethane foam. The resulting foam occupies a volume that is many times the volume of the liquid precursors.

One technique for foam-in place packaging is to place the article to be packaged in a container, and then to place one or more flexible plastic bags containing a foamable composition into the container. The foamable composition expands to cause the bag to fill the void spaces between the walls of the container and the article, and then hardens. The result is a foam cushion that conforms closely to the shape of the article and the container, and thereby protects the article. The bags prevent the expanding foam from contacting the walls of the container and the article. The foam cushion is sometimes referred to as a "foam-in-bag" cushion or package.

The packaging requirements of various users may often differ and typically no one packaging system can meet the needs of every potential user. As a result, many different techniques for preparing and using foam-in-place packaging systems have been developed.

A number of automated devices have been developed for rapidly making a relatively large number of bags for foam-in-bag packaging, and are assigned to the assignee of the present application. Exemplary devices are described and claimed in U.S. Pat. Nos. 4,674,268; 4,800,708; 4,854,109; 5,376,219; and 6,003,288. The resulting bags should be placed in the containers immediately after the precursors are dispensed and mixed because the precursors react quickly to form the foam. These devices are particularly suitable for use in situations where it is desirable and feasible to fill the bags with foam precursors at the location where articles are being packaged. Certain systems of this type are sometimes referred to as two-component systems because a polyurethane foam is typically prepared by reacting a polyol component with an isocyantate component.

It may not always be desirable or feasible to have an extensive system for preparing the bags or injecting foam precursors into a bag. In such cases, the user may require a foam-in-bag cushion that has the precursors pre-disposed in separate compartments in the bag. When desired, the user can combine the precursors in the bag to form the foam cushion. Exemplary devices are described and claimed in U.S. Pat. Nos. 5,699,902, 5,899,325, and 5,996,782.

The foam that is used in a foam-in-bag package may be a high or low density foam. Higher density foam is often used because of its ability to protect articles from a greater amount of shock and accommodate higher static loads. Generally, higher density foam tends to produce more heat from the reaction of the foam precursors during the foam formation process. Typically, the higher the density of the foam, the greater amount of heat that is produced during foam formation, although this is not necessarily so.

During the foam formation reaction, the temperature within the foam core can reach and exceed the melting temperature of the bag's thermoplastic material. If two or more foam cushions are in contact, the surface temperature of the adjoining cushions can often reach temperatures that will fuse the adjoining bags to one another. As a result, the cushions can be difficult to separate, and the article could be damaged during cushion separation. To prevent the cushions from fusing together, the cushions can be separated until they have sufficiently cooled off. Separating the cushions can create inefficiencies in the packaging system and make it more difficult to achieve packaging that conforms to the shape of the article.

Special high-temperature films can also be used to prevent the film layer from fusing to the film on the adjoining cushion. Generally these films are composed of at least two layers with an inner layer of high density polyethylene, or similar polymer, and the outer layer composed of a high-melting point polymer such as polyamide, polyester or polymethyl pentene. The two layers can be co-extruded, extrusion coated or laminated together. A third layer, called a tie layer is typically included between the two layers to allow otherwise incompatible resins to adhere.

These composite high-temperature films tend to be expensive and difficult to fabricate. They also tend to be stiff and crinkly, and have high tear propagation. In addition, they can be difficult to use in foam-in-bag machines because they cannot be readily cut with a hot cross cut wire on existing equipment.

BRIEF SUMMARY OF THE INVENTION

The invention is a thermoplastic film having a heat resistant coating. The film is particularly useful in the preparation of bags and associated packaging systems that are used for protecting and packaging articles. Typically, the heat resistant coating melts at a temperature that exceeds the melting temperature of the thermoplastic film and that exceeds the temperature of the heat generated during foam formation.

It has been found that varnishes and resins that can be crosslinked or thermoset are particularly useful as heat resistant coatings. In particular, flexographic and gravure inks having self-adhesion temperatures in excess of 275° F. can be applied to the surface of the thermoplastic bags in a sufficient weight to prevent the cushions from fusing together during foam formation. Typically, the inks are solvent-based, water-based, or energy cured. The addition of silicone to the heat resistant coating improves cushion separation.

Foam-in-bag products having heat resistant coatings that are in accordance with the invention are adeptly suited to prevent foam cushions from fusing together during packaging. As a result, the foam-in-bag cushions will eliminate many of the problems associated with the high temperatures that can be produced during foam formation and should improve the efficiency and speed at which articles can be packaged.

Thus, the invention provides, among other things, a foam-in-bag packaging system in which the bags are coated with high temperature resins or varnishes that can be crosslinked or thermoset, and that preclude foam cushions fusing due to the heat produced during foam formation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 6a through 6h illustrate in a step-wise manner an alternative method of forming heat resistant cushions that are in accordance with the invention.

DETAILED DESCRIPTION OF THE INVENTION

The invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
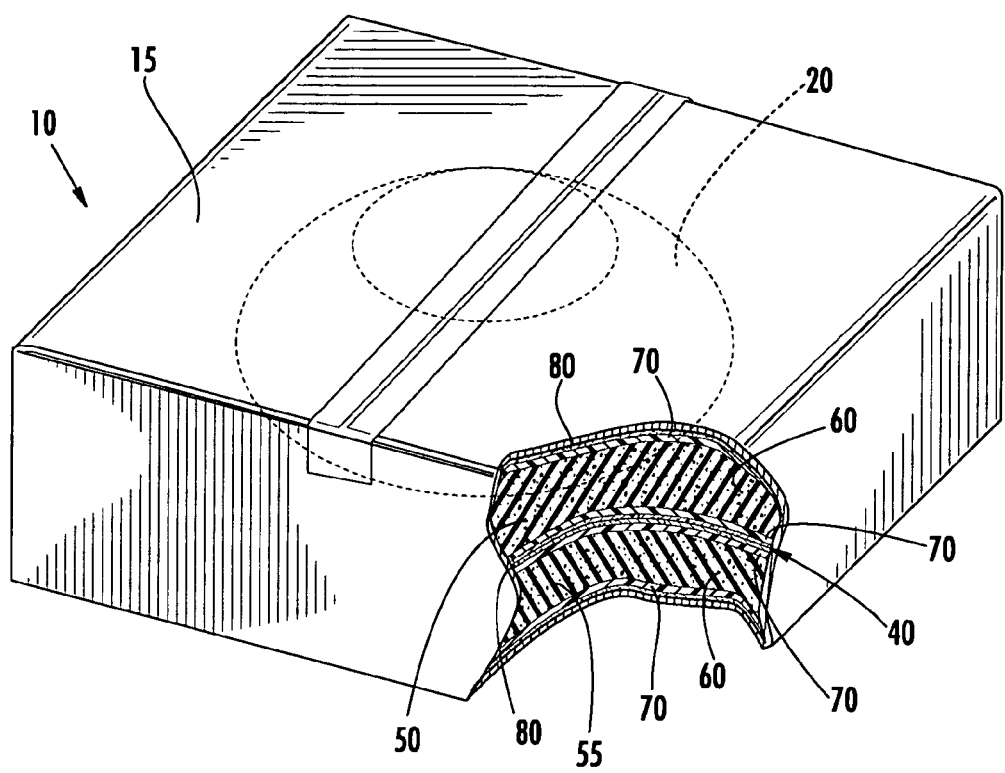
FIG. 1 is cross-sectional perspective of an article that has been protectively packaged with foam-in-bag cushions that are in accordance with the invention.

Referring now to the drawings, there is shown in FIG. 1 a cross-sectional view of an article packaged in a container and sandwiched between two foam-in-bag cushions, which is broadly designated by reference number 10. The article 20 is placed in a container 15 between a first foam-in-bag cushion 50 and a second foam-in-bag cushion 55. As shown, the cushions 50, 55 are in contact with each other at 40.

FIG. 1 illustrates a pair of foam cushions 50, 55 that are in accordance with the invention. The foam cushions are typically comprised of an outer exterior bag 70 that is made of a flexible thermoplastic material, a foam core 60, and a heat resistant coating 80 that substantially covers the exterior surface of the bag. It should be noted that it is not necessary for the entire surface of the bag to be completely covered with the heat resistant coating and that there may be small areas that are not covered, provided however, that these areas do not significantly impact cushion separation.

The heat resistant coating prevents the cushion's outer layer from fusing with itself or a second cushion. The heat resistant coating should substantially cover the outer exterior surface of the cushion so that the cushions can be easily separated after the foam forming process is complete. As discussed above, the foam formation process is an exothermic reaction that can cause the surfaces of two adjoining cushions to fuse or attach together. Suitable heat resistant coatings should prevent the cushions from fusing together as a result of the exothermic reaction. To accomplish this task, the heat resistant coatings should have self-adhesive temperatures that exceed the temperature produced during the exothermic reaction.

Depending on the particular foam being prepared, the amount of heat generated during the exothermic reaction is typically from about 200° F. to 420° F. Because there are a wide variety of different foams that can be used to create the foam core, the heat resistant coating can be selected so that it has a self-adhesive temperature that exceeds the temperature produced during foam formation. Typically, coatings that are useful in the invention should have self-adhesion temperatures that fall within the range from about 250° F. to about 450° F. At temperatures exceeding 275° F., films comprised of polyethylene can often fuse together. To prevent the films from fusing together, useful heat resistant coatings should typically have self-adhesive temperature that is greater than about 275° F. A somewhat more useful heat resistant coating should have a self-adhesive temperature in excess of about 425° F.

There are many different heat resistant coatings that could be used to prevent the cushions from fusing together. Typically, the coatings are varnishes or resins that can be can be crosslinked or thermoset. Ink based coatings are particularly useful as a heat resistant coatings. Useful ink coatings are typically varnish, or synthetic or natural resin based and may contain vegetable oils and solvents, or synthetic resins and solvents. Heat resistant soy protein-based inks are also useful as heat resistant coatings for the foam cushions.

Flexographic and gravure inks are particularly useful as a heat resistant coating. Useful flexographic inks should have a self-adhesion temperature that is in excess of about 275° F. and should readily adhere to the substrate material to which they are applied. Flexographic inks can typically be grouped into three distinct classifications: solvent-based inks; water-based inks; and energy cured inks. The first two categories typically contain a diluent and a resin. The inks may also contain colorants or additives.

Typically, water and solvent-based inks contain a diluent or solvent that provides fluidity to the ink component so that the ink can be carried from the ink fountain to the film substrate. The solvent should be able to quickly evaporate from the surface of the film after it has been applied. Heat with sufficient air movement can also be applied to help volatize the diluent and/or initiate crosslinking.

The solvent should also be able to dissolve or disperse the solid components of the ink. Common solvents that are used in solvent-based inks include, without limitation, alcohols, such as ethanol, propanol, isopropanol, and isobutanol; alkyl acetates, such as ethyl, propyl, and butyl acetate; and low molecular weight hydrocarbon solvents, such as alkyl from 4 to 8 carbons, cycloalkane from 4 to 7 carbons, and benzyl, and their derivatives. Typical examples of hydrocarbon solvents include, without limitation, heptane and naphtha. In water-based inks, the solvent is water that is often combined with other solvents, such as alcohols, glycols, and glycol ethers.

Water-based coatings/inks typically rely on polymers that contain an organic acid moiety that allows the polymer to dissolve in a basic solution. The solution is typically made basic by using ammonia, ethanolamine, or other suitable basic amines that evaporate from the solution as it dries. After the water and amine have evaporated, the resin is no longer water soluble.

The resins are typically organic compounds that are soluble in the solvent. The resin adheres to the thermoplastic film to produce a coating that substantially covers the surface of the cushion. Useful categories of resin include, without limitation, urethanes, acrylics, carboxylated acrylics, nitrocellulose, polyvinyl butryl, polyamides, polyimides, polyketones, PVC-PVA copolymers, and cellulose esters, and combinations thereof. Water-based acrylic urethanes with a self-adhesion temperature of about 425° F. are particularly useful heat resistant coatings.

Energy cured inks typically do not contain a solvent per se, in that the uncured liquid components are not added with the intention of being evaporated after application. Fluidity of the components is provided by liquid monomers or low molecular weight oligomers that are cured to form the coating. After application, energy cured inks react to form polymers upon exposure to energy, such as ultraviolet light or electron beam radiation. Typically, energy cured inks contain prepolymers, such as acrylics, acrylates, urethane acrylics, acrylated or methacrylated prepolymers, acrylated oils, and specialty products such as acrylated silicone oils and acrylated amines.

Additives can be added to the heat resistant coating to improve performance of the finished product. For example, plasticizers can be added to improve the flexibility of the coating; waxes or silicone can be added to help improve the peelability of the cushion surfaces from each other, and to improve abrasion or scuff resistance; and surfactants can be added to improve resin adherence to the film surface. Crosslinking agents such as azeridine and ZnO can also be added to improve chemical and heat resistance.

The weight of the coat of the heat resistant coating also affects the ease with which foam-in-bag cushions are separated. In this regard, Table 1 below illustrates that the higher the weight of the coating, the easier it will be to separate the cushions after foam formation.

TABLE 1

Peel strength as a function of coat weight

| Coat Weight (lb./ream) | Peel Strength (lb./inch) | Inverse Proportionality Constant (CW × PS) |
|---|---|---|
| 0.09 | 1.77 | 0.17 |
| 0.13 | 1.07 | 0.13 |
| 0.18 | 0.85 | 0.15 |
| 0.33 | 0.57 | 0.19 |
| 0.48 | 0.27 | 0.13 |

The data in Table 1 was obtained by printing five samples of film with a water-based urethane acrylic available from Sun Chemical. The coating was printed onto the film with a flexographic printing press. Coat weights were varied by using different Anilox rolls and by diluting the coating. The peel strength numbers were generated by heat sealing two layers of the film together. The films were sealed at 400° F. with a 5 second dwell and at a pressure of 122 pounds per square inch ("psi"). Samples were then cut out and peeled apart on a compression/tensile testing machine at a crosshead speed of 4 inches per minute. To determine coat weight, the film with coating was weighed, the coating was removed with a solvent, and the bare film was reweighed. The coat weight and peel strength are inversely proportional so that as the coat weight is increased the peel strength is typically decreased. Ideally, there is no peel strength and two adjoining cushions will simply "fall-away" from each other. Typically, the coat weight can vary from about 0.05 to 1 lb/ream, with coat weights from about 0.3 to 0.5 lb/ream being particularly useful. A ream of film is typically about 3000 square feet.

Generally, peel strength is affected by both the coat weight and the specific composition of the coating. Some coatings may have a negligible tendency to self-adhere at higher temperatures, and as a result, can have a lower coat weight. Other coatings may require a greater coat weight to prevent fusing. Regardless of the specific coating applied, the coat weight should be sufficient to ensure that the force necessary to separate two adjacent foam cushions is less than the yield strength of the film. Generally, if the peel strength exceeds the yield strength of the film, the film could be stretched and torn before separation. Typically, the peel strength of two adjacent cushions should be from about 0 to 2 lb/inch.

As described above, the heat resistant coating can also contain additives that help prevent the films from fusing together and lessen the amount of force that is necessary to peel the cushions apart. Useful additives include silicone and waxes. In this regard, Table 2 below illustrates that the addition of an additive, such as silicone can make the cushions easier to separate. The data in Table 2 indicates that the addition of the silicone to the heat resistant coating makes the cushions easier to separate than cushions that are coated with a heat resistant coating that does not contain silicone.

TABLE 2

Peel strength as a function of coat weight

| Coat Weight (lb./ream) | Peel Strength (lb./inch) | Silicone added (weight %) | Inverse Proportionality Constant (CW × PS) |
|---|---|---|---|
| 0.16 | 0.53 | 1.5 | 0.09 |
| 0.50 | 0.24 | 1.5 | 0.12 |

The data obtained in Table 2 was obtained using the same method discussed above for Table 1. Hydrotherm HR varnish CRNFW0835709 available from Sun Chemical, which has a self-adhesive temperature of about 425° F. was used to obtain the data in Table 2.

The heat resistant coating can typically contain from about 0.1 to 10% by weight silicone, and somewhat more typically, from about 0.5 to 2% silicone.

Other useful heat resistant coatings include, without limitation, reactive silicone release coatings, such as Syl-Off, which is available from Dow Corning; polyvinyl alcohol; styrene acrylic, cellulose acetate butyrate (CAB); cellulose acetate propionate (CAP); and a crosslinkable varnishes that crosslink after evaporation of the solvent. Typically, reactive silicone release coatings can be water emulsions, solvent-based, or solventless, and can be applied to a thermoplastic film using gravure or flexographic printing techniques. CAB and CAP coatings can be dissolved in a solvent and then coated onto the film, or alternatively, they can be crosslinked using urea-formaldehyde resins or by crosslinking with polyisocyanate resins.

Figure 2:
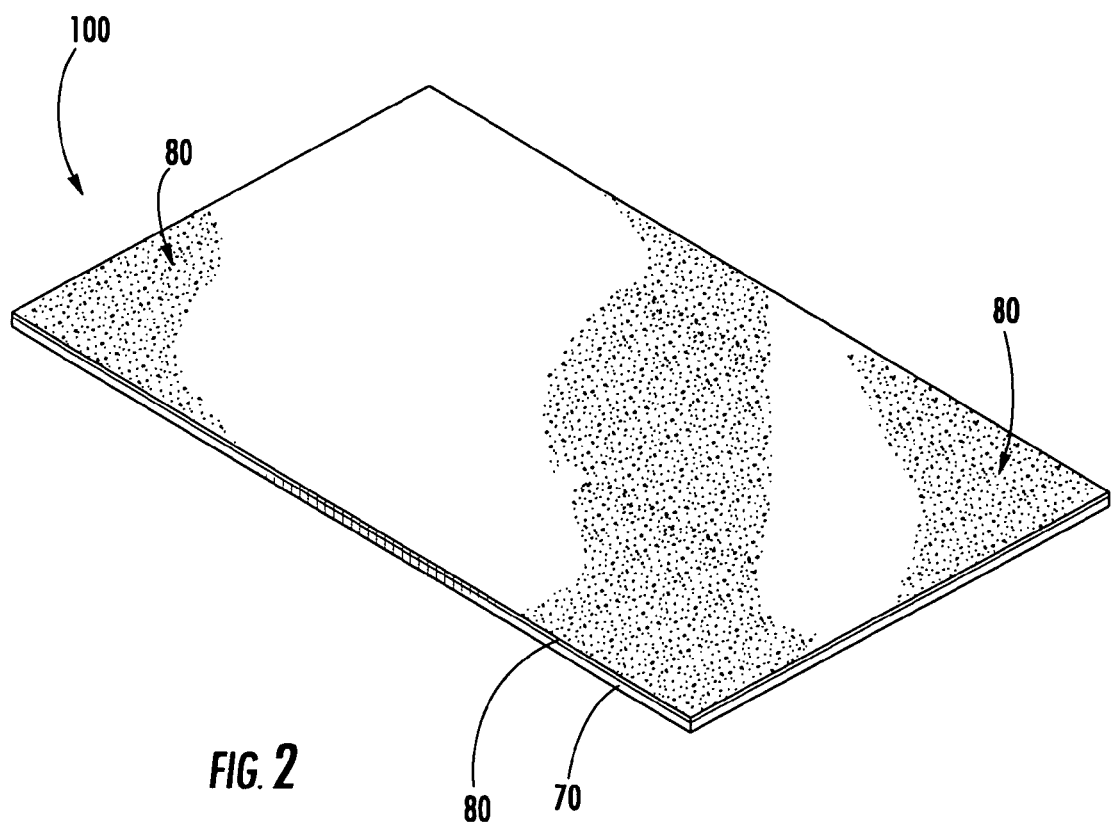
FIG. 2 is a perspective of a sheet of thermoplastic material that has been substantially covered with a heat resistant coating.

The bag is typically constructed of a sheet of flexible film. In this regard, FIG. 2 shows a sheet of thermoplastic material 70 that is coated with a heat resistant coating 80. Useful films can be made from a variety of different thermoplastic materials. Typically, films that are useful in the invention can be monoextruded or coextruded and include, without limitation, polypropylene, polyethylene, ethylene copolymers, and blends thereof. Useful films include, without limitation, high density polyethylene, low density polyethylene, linear low density polyethylene, ethylenevinyl acetate, ethylene methyl acrylate, ethylene ethyl acrylate, very low density polyethylene, ultra low density polyethylene, ionomers, polyurethane, polyvinyl chloride, polybutylene, and copolymers and blends thereof.

As discussed in the background, the foam-in-bag cushion is often prepared on-site immediately before an article is packaged. Producing the cushion at the point of packaging allows the cushions to conform to the shape of both the container and the article. Typically, the foam precursors are dispensed into the bag, and the bag and its foam contents are quickly placed into a container.

The foam substrate is usually prepared by mixing two or more fluid foam precursors together. The foam precursors are typically selected from polyol mixtures that can contain water, catalysts, surfactants, processing aids, and additional ingredients, and isocyanates, and mixtures of polyols and isocyanates. For example, one or more polyol mixtures may be supplied from a first fluid source to a dispenser (see FIG. 6f, reference number 640) while one or more isocyantes may be supplied from a second fluid source. Suitable fluid sources for the polyol(s) and isocyanate(s) may include a separate drum or other container for each chemical. The polyol(s) and isocyanate(s) may flow into a dispenser to be mixed or alternatively can be mixed within the bag.

As explained in the background, the polyol(s) and isocyanate(s) components are foam precursors which, when mixed, produce a foamable composition that reacts to form a polyurethane foam. The amount of foamable composition injected into the bag can be predetermined, based on, e.g., the internal volume within the container, the degree to which the foam expands, the amount of foam that is desired in the container, and the volume of the article that is to be packaged. The user could also manually control the amount of foamable composition that is injected into the bag.

Polyurethane foam is the most commonly used foam for foam-in-bag cushions. Other possible foams include, without limitation, polyureas, polyisocyanurates, and urea-formaldehyde. It should be recognized that other foams could be used, although not necessarily with equivalent results.

Foams that are useful in the invention can have a broad density range. Typically, the density of the foam should be from about 0.1 to 4.0 pounds per cubic foot ("pcf"), with foams having density ranges from about 0.2 to 3 pcf and from about 0.25 to 2 pcf being particularly useful.

There exists a variety of different ways to produce foam-in-bag cushions that are in accordance with the invention. Bags that are useful in the invention can be pre-formed, or the bags could be formed at the point of packaging. Regardless of how, when, and where the bags are formed, the bags can be prepared to have a variety of different sizes and shapes so that they are useful in a broad range of packaging applications.

The film can be formed into a bag with a variety of methods. Typically, the film will be coated with a heat resistant coating prior to formation into a bag and the coated film is stored as roll stock until used to prepare packaging. It should be recognized that the coating could also be applied directly onto the surface of a preformed bag, although not necessarily with equivalent results. Typically, at least one surface of the film is substantially covered with a heat resistant coating sufficient to preclude self-adhesion of the film at temperatures below the self-adhesion temperature of the coating.

A technique disclosed in U.S. Pat. No. 6,003,288, the contents of which are incorporated by reference, describes a process and apparatus for preparing a foam-in-bag cushion wherein a sheet of thermoplastic film is center-folded to produce an edge along one side of the bag. Thereafter, the transverse edges of the bag are sealed and foam precursors are then injected into the opening opposite the centerfold. The last remaining edge is sealed and the foam-in-bag cushion is placed into a container.

Figure 3:
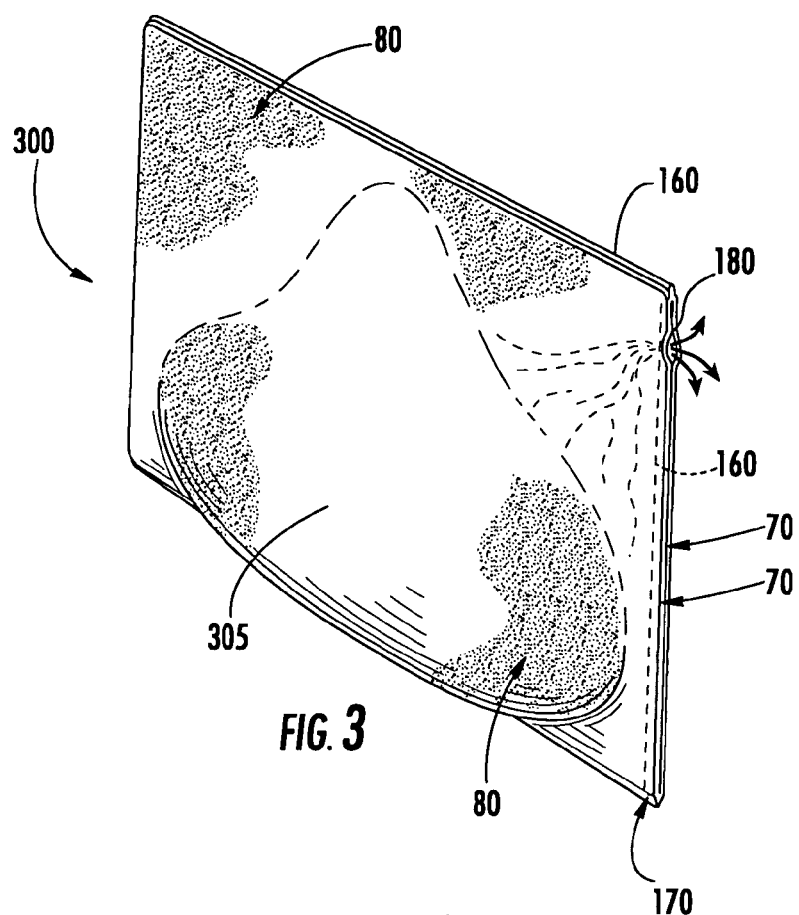
FIG. 3 is a side view of a foam-in-bag cushion having a heat resistant coating.

In this regard, FIG. 3 illustrates a cushion 300 having an edge 170 that is formed from a centerfold and three edges 160 that have been sealed. The cushion 300 has been prepared from a single continuous film 70 that has a first surface 305 that is substantially covered with a heat resistant coating 80, and a second surface that does not have a heat resistant coating (not shown). As shown in FIG. 3, the film 70 has been center-folded 170 so that a double web is formed wherein the heat resistant coating 80 faces outwardly and is disposed on the cushion's exterior surface 305. The center-fold divides the second surface into two halves that are in a face-to-face arrangement. The face-to-face arrangement of the second surface defines the interior of the bag. After center-folding the sheet, foam precursors can be injected into the bag's interior. The sheets can be center-folded at the time of bag manufacture, or alternatively, the sheets can be supplied pre-folded.

Typically, the cushion will have one or more vents 180 which permit gases generated during foam formation to escape. The vent 180 is usually produced by providing a small, unsealed opening along one of the edges of the bag.

In an alternative embodiment, the bag can be formed from superimposing two sheets of thermoplastic film in a face-to-face arrangement. In this embodiment, both sheets have a surface that has been substantially coated with a heat resistant coating. The sheets are superimposed so that the surfaces having heat resistant coatings are on the exterior surfaces of the bag. Typically, the surfaces of the sheets that are arranged face-to-face are not coated with the heat resistant material. The non-coated surfaces define the bag's interior and are heat sealable. After the sheets are superimposed, the sheets are sealed together along a transverse edge of the sheet. Foam precursors can then be injected into the interior space between the sheets. Alternatively, both longitudinal edges could also be sealed before injecting the foam precursors. After the foam begins to expand, any remaining open edges are closed. The cushion typically contains one or more gas vents.

Figure 4:
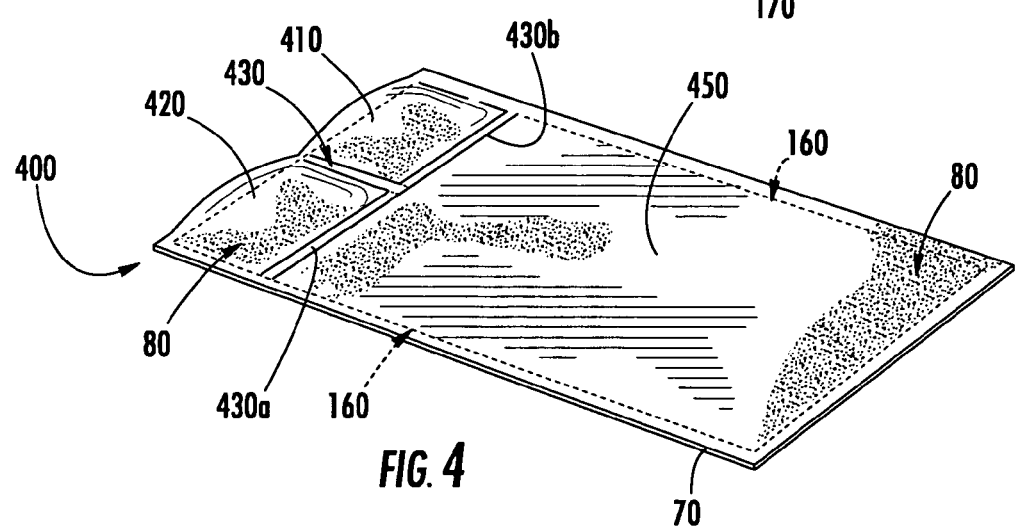
FIG. 4 is a top view of a foam-in-bag packaging product that has foam precursors disposed in separate cells within the bag, and that has been substantially covered with a heat resistant coating.

FIG. 4 illustrates an embodiment of a foam-in-bag cushion having a heat resistant coating in which the foam precursors are pre-disposed in separate cells contained within the bag. This type of foam cushion is particularly suited for situations where it may not be feasible or desirable to form cushions with a precursor injection system. Exemplary foam-in-bag cushions are disclosed in U.S. Pat. Nos. 5,996,782 and 5,899,325, the contents of which are incorporated by reference.

As shown in FIG. 4, the foam-in-bag cushion packing system 400 has two separate cells 410, 420 that are separated by a frangible seal 430, and a larger interior cell 450 which in most circumstances is the cell into which the foam expands after the precursors are mixed. The cells containing the precursors are typically separated from the interior cell 450 by one or more frangible seals that can be located at 430a or 430b. Typically, only one of the seals 430a or 430b is frangible. When the user desires to mix the precursors and form the foam, the user can manually rupture the seal 430. As a result, the two formerly separate cells 410, 420 are in communication with each other so that the precursors contained within the cells can be mixed together. The non-frangible seal (430a or 430b) that separates the two separate cells from the interior cell 450 serves to direct the precursors into the same cell where they are mixed before expanding into the interior cell to form the cushion.

Alternatively, the unreacted precursors can be separately contained within a separate packet that is disposed within the interior space of the bag. The separately formed packet is placed within the interior space of the bag and is typically adjacent to one end of the bag. The packet can be sealed or adhered to the inner surface of the bag so that the packet is stationary within the bag.

The packet contains a plurality of separate compartments. Typically, the packet contains a first and second compartment. First and second foam precursor components are contained in the separate compartments within the packet and are maintained separated by an interior frangible seal. The packet is typically formed of a barrier material that is capable of maintaining the foam precursors in a substantially stable and unreacted state for the desired shelf life of the foam-in-bag cushion precursor. A second frangible seal separates the compartments from the interior space.

When it is desired to produce the foam, breaking the first frangible seal and mixing the first and second foam precursors together can produce the foam. After the precursors are mixed, the expanding foam will exert pressure on the second frangible seal causing it to break. The expanding foam will then expand out of the packet into the enclosed space within the bag. Typically, the bag will have vents through which gases can escape.

Bags prepared in accordance with the invention can be closed in a variety of different means. With reference to FIGS. 3 and 4, foam cushions are illustrated having edges that are sealed 160. Typically, the edges of the bag can be sealed using a heat seal that is formed by applying pressure and heat to the edges of the films along their edges 160. The heat seal is typically formed on the interior surfaces of the bag, which are usually not covered with the heat resistant coating. It should be recognized that the edges of the bag could be closed with other methods, although not necessarily with equivalent results. Such methods include, without limitation, mechanical fasteners, clips, threaded seams, or the like.

It may not always be necessary to seal all edges of the bag. For instance, after the precursors are injected into a bag having at least one open edge, the open edge of the bag can be closed by folding over the open end of the bag to effectively prevent the expanding foam from escaping the bag.

There are many different packaging applications in which the invention should be useful. For instance, rather than preparing the bags on-site, the bags could be preformed on a continuous roll of thermoplastic material. Typically, each successive bag on the roll would be separated by a perforation that would allow the bag to be quickly and easily separated from the roll. Bags of this manner would be particularly useful with devices that are designed for quickly dispensing a pre-determined amount of foam precursors into a bag for the immediate packaging of an article.

Typically, a method of packaging an article with a foam-in-bag cushion that is in accordance with the invention would include the steps of forming a first cushion with a heat resistant coating; placing the first cushion in a container; placing the article on the surface of the first cushion; forming a second cushion having a heat resistant coating; and placing the second cushion within the container so that the article is sandwiched between the first and second cushions. These steps are discussed in greater detail below.

Typically, the first step would involve providing a container in which to place the article. The step of forming the cushion could be accomplished in several different ways. For example, the bags could be prepared on-site at the point of packaging in a method similar to those described above, the foam-in-bag products could by preformed with the precursors predisposed within the bag, or the cushions could be prepared by injecting the precursors directly into a preformed bag. After the cushion is formed, it is placed within the container so that a surface having the heat resistant coating is disposed upwardly. Preferably, the cushions are placed within the container while the foams are still expanding. This will allow the foam within each cushion to conform to the shape of the container. In the next step, the article is placed within the container on the surface of the expanding foam cushion. The article is also preferably placed on the cushion while the foam is still expanding. This allows the cushion to conform to the shape of both the article and the container. Next, the second cushion is formed, typically in a manner described above, and placed within the container. Both cushions should be orientated in the containers so that when the article is packaged, the heat resistant surfaces on both cushions will be facing each other (see FIG. 1, reference number 40).

Figure 5A:
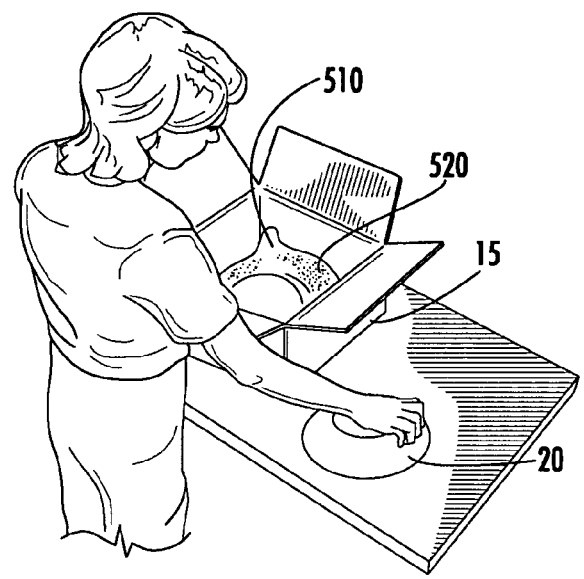
FIGS. 5a through 5c illustrate in a step-wise manner a method of protectively packaging an article with foam-in-bag cushions that are in accordance with the invention.
Figure 5B:
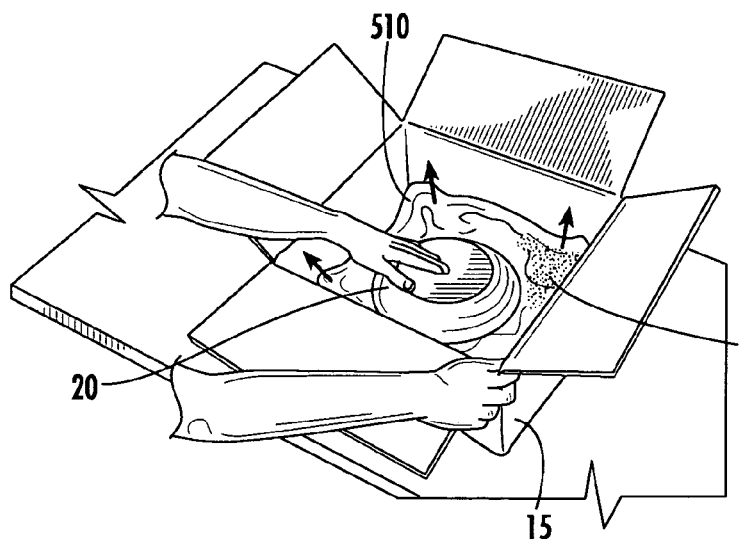
Figure 5C:
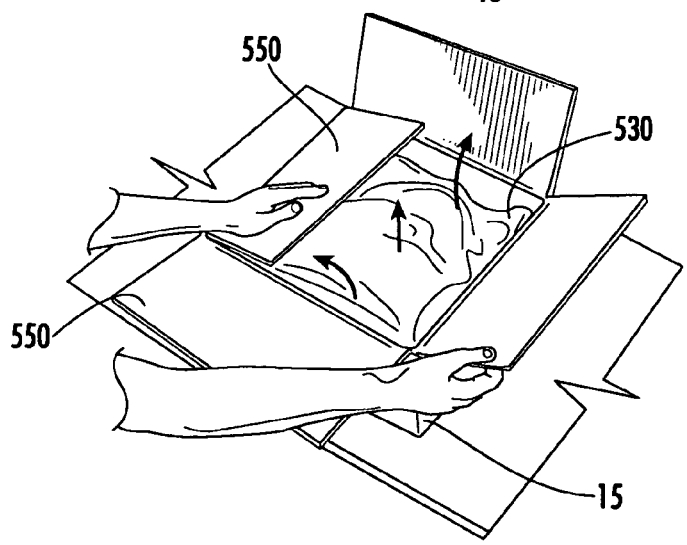

With reference to FIGS. 5a through 5c, a method of packaging an article using foam-in-bag cushions that are in accordance with the invention is illustrated. FIG. 5a shows a foam-in-bag cushion 510 having a heat resistant coating 520 positioned in the bottom of a container 15. In FIG. 5b an article 20 is positioned on the first cushion 510. The arrows in FIG. 5b represent the cushion 510 expanding within the container and around the article as the foam forming reaction progresses. In the next step, illustrated in FIG. 5c, a second cushion 530 is placed within the container 15 covering the article 20 and first cushion 510. The flaps 550 on the container can then be folded over to close the container.

As discussed in greater detail below, the cushions can also be formed without injecting the precursors into a bag. For example, the precursors can be dispensed directly onto a sheet of thermoplastic film that can be placed directly into the container. After dispensing the precursors, the edges of the film are folded over so that they cover the expanding foam and create the cushion. In this regard, FIGS. 6a through 6h illustrate step-by-step, a method of protectively packaging an article using a thermoplastic film sheet that is in accordance with the invention.

Figure 6A:
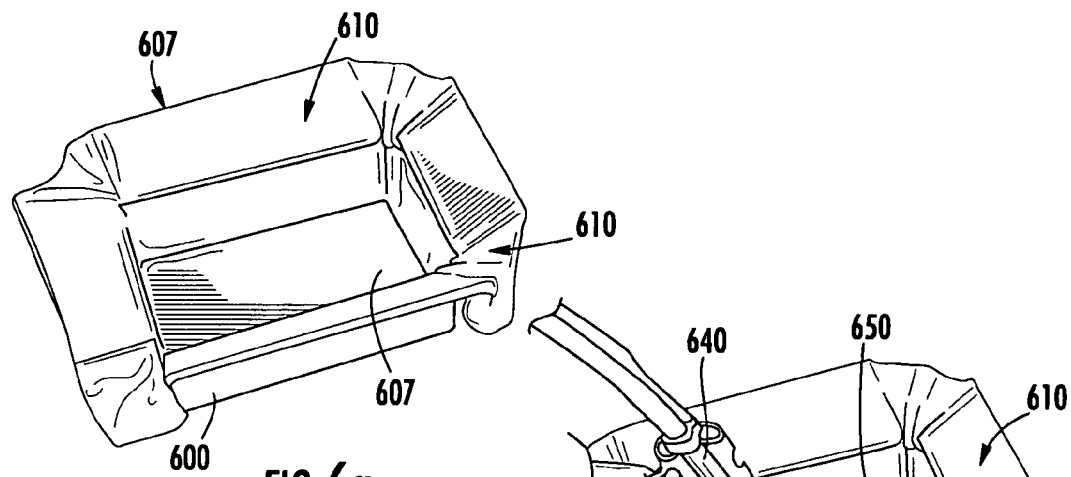
Figure 6B:
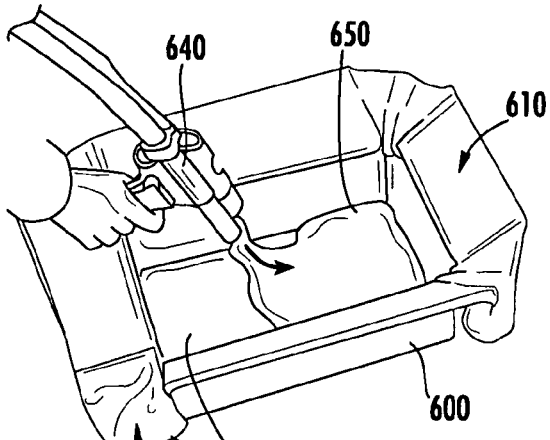

As shown in FIG. 6a, a thermoplastic film sheet 607 having a heat resistant coating is positioned in a container 600. Typically, the film will have a first surface that is covered with a heat resistant coating and a second surface that is not covered. The film is positioned with the heat resistant coating facing downwardly towards an inner surface of the container. In the next step (FIG. 6b), foam precursors 650 are dispensed into the container and react to form the protective foam. FIG. 6b illustrates that the foam precursors are dispensed onto the film to define a central area on the film that is covered with the expanding foam and an outer area along the periphery of the film that is not covered. As shown in FIG. 6b, the uncovered periphery is comprised of the edges of the film 610 that extend circumferentially outward around the expanding foam 650. Typically, the precursors are dispensed with a handheld dispenser 640 or similar device.

Figure 6C:
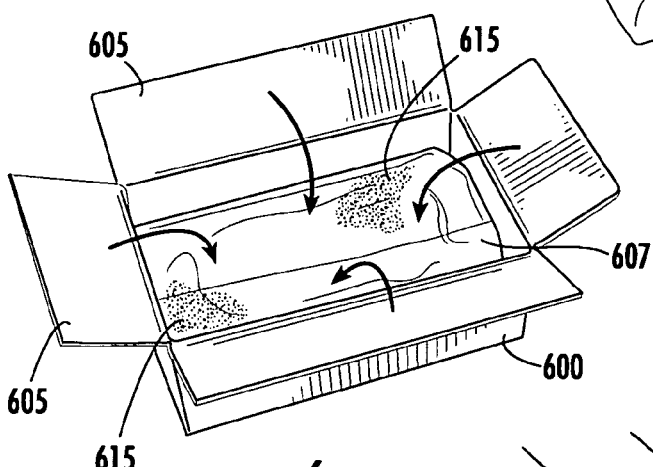

Next, the edges of the film 610 are folded over the expanding foam. As shown in FIG. 6c, the edges are folded over the expanding foam so that the foam is completely covered by the film 607 and the heat resistant coating 615 that was originally faced downwardly, now faces upwardly away from the foam. Having the heat resistant surface facing upwardly will ensure that a second cushion will have its surface in contact with the heat resistant surface.

Figure 6D:
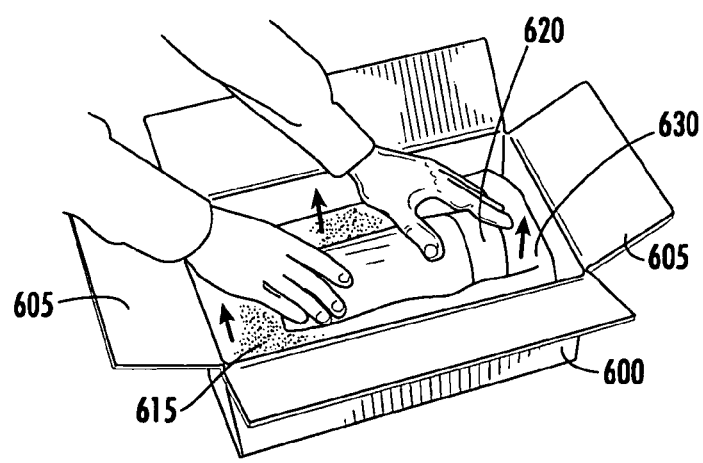

FIG. 6d illustrates that the article 620 is then placed on the heat resistant surface of the film 615. The expanding foam cushion 630 conforms to the shape of the article and the container. The arrows in FIG. 6d are representative of the foam expanding within the container and around the article.

In FIG. 6e a second sheet of thermoplastic film having a heat resistant coating is shown being placed into the container so that it covers the article and the first cushion. The heat resistant coating faces towards the article and the first cushion. A second amount of foam precursors 650 are dispensed onto the film 660 (FIG. 6f). The expanding foam 650 defines an area that contains expanding foam and an area 665 that does not. Similar to the first cushion described above, the expanding foam defines an uncovered periphery that is comprised of the edges of the film 665 that extend circumferentially outward around the expanding foam 650. The non-covered edges 665 of the thermoplastic film are depicted in FIG. 6f as overlying the flaps 605 of the container 600.

FIG. 6h illustrates an article that has been packaged by preparing a first and second foam cushion. FIG. 6h shows that the heat resistant coatings 615, 675 on the first and second cushions 630, 670, respectively, are in contact with each other and the article when they are in their final packaged orientations. As illustrated with reference number 680, the cushions conform to the shape of the article to provide a cushion packaging system that is custom tailored to each individual article.

It should be evident from the above disclosure that the heat resistant coatings would be useful in a multitude of packaging applications. The coatings are particularly useful where it is desirable to prevent the heat generated during foam formation from fusing the thermoplastic films to each other. It should also be recognized that heat resistant coatings that are in accordance with the invention would be useful on a variety of different packaging films and bags, regardless of how they are prepared.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A heat resistant bag adapted for use in foam-in-place packaging comprising:
    a thermoplastic film material having three closed edges and an open edge defining an interior space; and
    a heat resistant coating having a self-adhesion temperature in the range from about 250° F. to 450° F. and selected from the group consisting of flexographic ink, gravure ink, silicone release coating, polyvinyl alcohol, cellulose acetate butyrate, cellulose acetate propionate, and a crosslinked varnish, and wherein the coating substantially covers the exterior surface of the bag sufficient to reduce self-adhesion of the film at temperatures below the self-adhesion temperature of the coating, whereby foam-in-bag packages formed therefrom are easily separated after the foam is formed.

2. The bag according to claim 1, wherein the bag is disposed on a continuous roll of successive thermoplastic bags, and wherein each successive bag is detachable from the continuous roll.

3. The bag according to claim 2, wherein a perforation separates each successive bag.

4. The bag according to claim 1, wherein the coating has a self-adhesion temperature in excess of about 425° F.

5. The bag according to claim 1, wherein the coating is an ink resin or ink varnish that is solvent-based, water-based, or energy cured.

6. The bag according to claim 5, wherein the ink coating has a resin or varnish that is comprised of urethanes, acrylics, carboxylated acrylics, nitrocellulose, polyamides, polyimides, polyketones, or cellulose esters, or combinations thereof.

7. The bag according to claim 1, wherein the ink coating contains silicone.

8. The bag according to claim 1, wherein the yield strength of the film is greater than the force necessary to separate two adjacent bags.

9. The bag according to claim 1, wherein the thermoplastic film is high density polyethylene, low density polyethylene, linear low density polyethylene, ethylene vinyl acetate, ethylene methyl acrylate, ethylene ethyl acrylate, very low-density polyethylene, ultra low-density polyethylene, ionomers, polyurethane, polyvinyl chloride, or polybutylene, or copolymers or blends thereof.

10. The bag according to claim 9, wherein the film is high density polyethylene.

11. A foam cushion for packaging comprising:
    a bag that is formed from a thermoplastic film material that is closed on all four edges and defining an interior space;
    a heat resistant coating that substantially covers the exterior surface of the bag, the heat resistant coating comprising flexographic ink, gravure ink, silicone release coating, polyvinyl alcohol, cellulose acetate butyrate, cellulose acetate propionate, a crosslinked varnish, or combinations thereof; and
    a foam substrate disposed in the interior of the bag that is formed from mixing a first and second foam precursor together.

12. The foam cushion according to claim 11 wherein the heat resistant coating has a self-adhesion temperature in excess of about 275° F.

13. The foam cushion according to claim 11, wherein the heat resistant coating has a self-adhesion temperature in excess of about 425° F.

14. The foam cushion according to claim 13, wherein the flexographic or gravure ink is solvent-based, water-based, or energy cured.

15. The foam cushion according to claim 14, wherein the heat resistant coating contains silicone.

16. The foam cushion according to claim 15, wherein the silicone is present in an amount that is from 0.5 to 2% by weight relative to the total weight of the coating.

17. The foam cushion according to claim 11, wherein the thermoplastic material is polypropylene, high density polyethylene, low density polyethylene, linear low density polyethylene, ethylene vinyl acetate, ethylene methyl acrylate, ethylene ethyl acrylate, very low density polyethylene, ultra low density polyethylene, ionomers, polyurethane, polyvinyl chloride, polybutylene, or copolymers or blends thereof.

18. The foam cushion according to claim 11, wherein the thermoplastic material is high density polyethylene.

19. The foam cushion according to claim 11, wherein the foam substrate is a foam having a density from about 0.1 to 4 pcf.

20. The foam cushion according to claim 11, wherein the foam substrate is polyurethane.

21. The foam cushion according to claim 11, wherein the edges of the bag are closed with a heat seal.

22. A foam cushion for packaging comprising:
   a bag that is formed from a thermoplastic material that is closed on all its edges and defining an interior space;
   an ink resin or varnish coating that substantially covers the exterior of the bag having a self-adhesion temperature from about 250° F. to 450° F.; and
   a rigid foam substrate disposed in the interior of the bag.

23. The foam cushion according to claim 22, wherein the ink coating is solvent-based, water-based, or energy cured.

24. The foam cushion according to claim 23, wherein the ink coating has a resin that is comprised of urethanes, acrylics, carboxylated acrylics, nitrocellulose, polyamides, polyimides, polyketones, or cellulose esters, or combinations thereof.

25. The foam cushion according to claim 23, wherein the solvent-based ink coating has a solvent that is comprised of ethanol, propanol, isopropanol, isobutanol, ethyl acetate, propyl acetate, butyl acetate, heptane, or naphtha.

26. The foam cushion according to claim 22, wherein the foam substrate has a density that is from about 0.25 to 2 pcf.

27. The foam cushion according to claim 22, wherein the ink coating has a coat weight from about 0.05 to 1 lb/ream.

28. The foam cushion according to claim 22, wherein the foam cushion has a peel strength that is from about 0 to 2 lb/inch.

29. The foam cushion according to claim 22, wherein reacting an isocyanate with a polyol produces the foam substrate.

* * * * *